(12) United States Patent
Mani et al.

(10) Patent No.: US 8,830,830 B2
(45) Date of Patent: Sep. 9, 2014

(54) BANDWIDTH MANAGEMENT IN AN ADVANCED METERING INFRASTRUCTURE

(71) Applicant: Itron, Inc., Liberty Lake, WA (US)

(72) Inventors: Mehdi Mani, Paris (FR); Daniel Popa, Paris (FR); Hartman Van Wyk, Montloius sur Loire (FR)

(73) Assignee: Itron, Inc., Liberty Lake, WA (US)

( * ) Notice: Subject to any disclaimer, the term of this patent is extended or adjusted under 35 U.S.C. 154(b) by 28 days.

(21) Appl. No.: 13/648,077

(22) Filed: Oct. 9, 2012

(65) Prior Publication Data

US 2014/0056149 A1 Feb. 27, 2014

(30) Foreign Application Priority Data

Aug. 27, 2012 (EP) .................................... 12181869

(51) Int. Cl.
*H04L 12/26* (2006.01)
*H04L 12/28* (2006.01)

(52) U.S. Cl.
USPC ..................... 370/230.1; 370/235; 370/235.1; 370/236; 370/395.21; 370/328; 709/233; 709/234; 709/235

(58) Field of Classification Search
None
See application file for complete search history.

(56) References Cited

U.S. PATENT DOCUMENTS

| | | | | |
|---|---|---|---|---|
| 5,164,938 | A * | 11/1992 | Jurkevich et al. | 370/231 |
| 6,553,568 | B1 * | 4/2003 | Fijolek et al. | 725/111 |
| 6,822,940 | B1 * | 11/2004 | Zavalkovsky et al. | 370/237 |
| 7,646,718 | B1 * | 1/2010 | Kondapalli et al. | 370/235.1 |
| 8,000,242 | B2 * | 8/2011 | Wang et al. | 370/235 |
| 8,009,568 | B2 * | 8/2011 | Pinter et al. | 370/235 |
| 8,014,273 | B1 | 9/2011 | Barrett et al. | |
| 8,345,548 | B2 * | 1/2013 | Gusat et al. | 370/230 |
| 8,509,085 | B2 * | 8/2013 | Bader et al. | 370/236 |
| 8,520,523 | B2 * | 8/2013 | De Roucy et al. | 370/235 |
| 8,537,685 | B2 * | 9/2013 | Lee et al. | 370/236 |
| 8,593,962 | B2 * | 11/2013 | Bugenhagen | 370/232 |
| 2004/0264377 | A1 | 12/2004 | Kilkki et al. | |
| 2006/0215550 | A1 * | 9/2006 | Malhotra | 370/229 |

(Continued)

FOREIGN PATENT DOCUMENTS

| EP | 1619917 | 1/2006 |
|---|---|---|
| EP | 2182686 | 5/2010 |

OTHER PUBLICATIONS

The Extended European Search Report mailed Dec. 12, 2012 for European patent application No. 12181869.4, 8 pages.

(Continued)

*Primary Examiner* — Candal Elpenord
(74) *Attorney, Agent, or Firm* — Lee & Hayes, PLLC (57) ABSTRACT

In a network environment, a node may measure and/or recognize network activity or congestion and send feedback to downstream nodes (i.e., higher rank nodes) in response. During periods of lower network activity, lower congestion and/or lower network load, the feedback may direct an upstream flow of packets to be transmitted at a quality of service (QoS) level that allows consumption of more bandwidth than is indicated by a QoS level associated with a service level agreement (SLA) of the upstream flow of packets. During periods of higher network activity, congestion and/or network load, the feedback may limit the upstream flow of packets to the QoS level associated with the SLA of the upstream flow of packets. Accordingly, an upstream node (e.g., a root node) may use feedback to regulate bandwidth used by one or more downstream nodes and/or flows of packets, in part using network activity, congestion and/or bandwidth availability.

20 Claims, 5 Drawing Sheets

(56) References Cited

U.S. PATENT DOCUMENTS

| | | |
|---|---|---|
| 2007/0058536 A1 | 3/2007 | Vaananen et al. |
| 2008/0089390 A1 | 4/2008 | Picard |
| 2008/0247314 A1 | 10/2008 | Kim et al. |
| 2011/0170408 A1 | 7/2011 | Furbeck et al. |
| 2011/0273983 A1 | 11/2011 | Bergamasco et al. |
| 2012/0327768 A1* | 12/2012 | Sarwar et al. .............. 370/230.1 |

OTHER PUBLICATIONS

The PCT Search Report mailed Mar. 28, 2013 for PCT application No. PCT/US12/59385, 9 pages.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.

* cited by examiner

BANDWIDTH MANAGEMENT IN AN ADVANCED METERING INFRASTRUCTURE

RELATED APPLICATIONS

This application claims priority to European Patent Application 12181869.4, filed 27 Aug. 2012, which is incorporated herein by reference.

BACKGROUND

In an advanced metering infrastructure (AMI), a node may be associated with the metering of a consumable resource, such as electricity, natural gas or water. Such nodes may be organized as an autonomous routing area (ARA), having a tree structure that may be headed by a root node and/or router node. Network traffic may include both upstream and downstream flows of packets. Upstream flows may involve each node forwarding packets to an upstream node (e.g., one-hop parent). Downstream flows may involve each node forwarding packets to a downstream node (e.g., one-hop children of the node), which may be done according to explicit route information.

Both upstream and downstream flows of packets may consume limited bandwidth available in the ARA. Accordingly, the transmission of one or more flows, or packets within the flow(s), may slow the transmission of other packets and/or flows of packets. Thus, many packets, and entire flows of packets, may fail to meet quality of service (QoS) requirements and/or service level agreements (SLAs).

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Existing networks, such as an autonomous routing area (ARA) configured to function as an advanced metering infrastructure (AMI), fail to provide adequate bandwidth management. In particular, existing networks do not provide an effective way to manage data transmission rates by applications, and may allow excessive data transmissions by particular nodes or particular applications to slow down portions of a network. Such networks may include flows of packets in both upstream (toward the root node) and downstream (away from the root node) directions. The root node is frequently in communication with a central office through one or more networks, while "leaf" nodes may be associated with components on an electrical grid, such as utility resource consumption measuring meters. The nodes in the network may be considered to have a "rank" (sometimes called an "order"), wherein nodes further from the root node have higher rank and nodes closer to the root node have lower rank. Distances between nodes may be consider to be "closer" or "further" based on a number of "hops" or RF transmissions required to bridge between the nodes. Aspects of packet transmission may be controlled by a flow label contained in a flow ID header of a packet. The flow label may indicate a quality of service (QoS) level, which may indicate a data rate, bandwidth and/or priority of service to be accorded to a flow of packets. The QoS level may be associated with a service level agreement (SLA) that may specify class of service or QoS level that should be associated with a flow of packets. If a network is experiencing little congestion (i.e., the network has available bandwidth and/or congestion is less than a first threshold value), then an upstream node may send feedback to a downstream node(s) and/or its applications to increase bandwidth consumed by upstream flow(s) of packets. However, if the network is experiencing considerable congestion (e.g., the network has little available bandwidth and/or congestion is more than a second threshold), then an upstream node may send feedback to a downstream node(s) and/or its applications to decrease bandwidth consumed by upstream flow(s) of packets. The below discussion includes several representative examples that provide techniques for managing bandwidth in a network and/or an AMI.

One or more upstream flows of packets may originate at one or more downstream nodes, respectively. In an example environment, the downstream nodes may be associated with utility meters measuring consumption of electricity, natural gas, water or other consumable resources. The upstream flow may include packets having flow labels indicating an original and/or assigned QoS level that is commensurate with a service level agreement (SLA). In operation, packets of the upstream flow are passed up the network, relayed upstream toward the root node by one or more intermediate nodes. When bandwidth is readily available, the root node and/or other upstream node(s) may send feedback directing an increase or upgrade the QoS level associated with a downstream node and/or application on the downstream node. The QoS upgrade may be performed by upgrading the flow label to indicate a higher QoS level. The indication of the higher QoS level by the flow ID headers of packets of the upstream flow may provide additional bandwidth to the flow, and may allow the flow to move more packets and/or data in less time.

However, during times of increased network congestion, the extra bandwidth consumed as a result of the upgraded QoS level of the upstream flows may prevent the network from meeting one or more target SLAs. The root node and/or other node may detect such congestion, such as by operation of diagnostic tools, failure of flows of packets to maintain desired QoS levels, failures of SLAs, overflowing buffers, and the like. In response to the congestion, the root node or other upstream node may send feedback to some or all of the nodes within the ARA managed by the root node. The feedback may direct the nodes and/or applications running on the nodes to reduce a QoS level of a flow of packets, such as to an original QoS level associated with a SLA of the flow. Accordingly, nodes may benefit from available bandwidth during periods free from network congestion. However, feedback may be used when bandwidth is no longer available to support an upgraded QoS level assigned to one or more upstream flows.

The discussion herein includes several sections. The discussion, drawings and each section are intended to be examples of techniques and/or structures, but are not intended to indicate elements which must be used and/or performed. More particularly, this entire description is intended to illustrate components and techniques that may be utilized in bandwidth management in an AMI, but not components or techniques which are necessarily required. The discussion begins with a section entitled "Example Network," which describes one environment that may implement the techniques described herein. This section depicts and describes an example of an AMI that may include the techniques for bandwidth management. A second section entitled "Example Node" illustrates and describes an example node within the AMI. This section provides examples of structures that perform representative functionality, including management of upstream and downstream packet flows, setting of QoS levels, and bandwidth regulation by techniques such as feedback. A third section, entitled "Example Methods," discusses techniques for implementing methods utilizing devices including processor(s), memory devices, application specific and integrated circuits (ASICs), etc. A fourth section entitled "Example Flow Management" illustrates and describes aspects that may be used to manage flows of packets and to shape, tune and optimize the flow of data and packets in an ARA or other network. Finally, the discussion ends with a brief conclusion. This brief introduction, including section titles and corresponding summaries, is provided for the reader's convenience and is not intended to describe and/or limit the scope of the claims or any section of this disclosure.

Example Network

Figure 1:
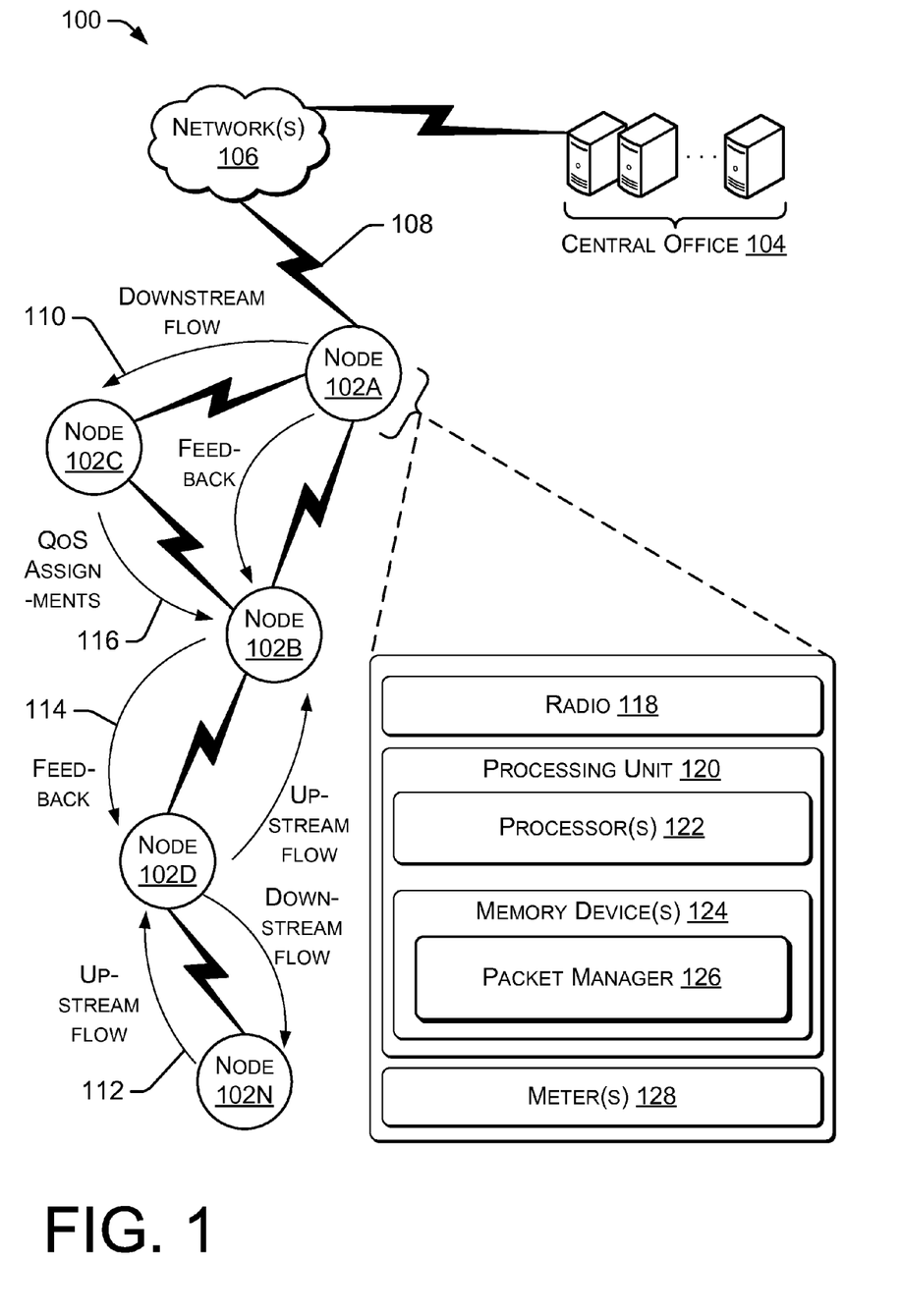
FIG. 1 is a diagram showing an example network having a plurality of nodes, some detail of one example node, a connection to a further network such as the Internet, and a central office.

FIG. 1 is a diagram showing an example network 100, which may comprise an advanced metering infrastructure (AMI) organized as an autonomous routing area (ARA) or other network. The network architecture 100 may be configured as a smart grid, such as an AMI network including a number of utility meters having wireless communication capabilities. The utility meters may measure consumption of electricity, natural gas, water or other consumable resources.

FIG. 1 shows a plurality of nodes 102 and some detail of a particular node 102A. The nodes 102 may be connected to a central office 104 by a network 106 such as the Internet. Within the network 100, nodes may communicate by means of radio RF links 108, power line communication (i.e., a signal superimposed over current flowing in an electrical power transmission grid) or other medium.

The network architecture 100 may include a plurality of nodes 102A, 102B, 102C, 102D, . . . 102N (collectively referred to as nodes 102) communicatively coupled to each other via direct communication RF signals, power line communication (PLC) links, or other types of transmissions. Some of the nodes may be associated with utility meters. In this example, N represents an example number of nodes in an ARA, which may be configured as a wide area network (WAN), metropolitan area network (MAN), local area network (LAN), neighborhood area network (NAN), personal area network (PAN), a combination of the foregoing, or the like.

The node 102A may be considered to be a "root," "root node," "field area router," or similar, and may be configured to connect the ARA to servers within the central office 104 by way of a back-haul network, such as the network 106. The nodes 102 may communicate by means of signals 108, which facilitate both upstream and downstream transfer of data, information, reports, queries and packets, etc. The root node 102A may send feedback and/or one or more downstream flows of packets 110 to one, some or all of the nodes within the ARA. The downstream flows may be sent according to a QoS level set by the root node 102A and indicated in a flow ID header of each packet of the flow.

The central office 104 may be implemented by one or more computing devices, such as servers, server farms, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

The network(s) 106 may comprise a wireless or a wired network, or a combination thereof, such as the Internet. The network 106 may be a collection of discrete and/or interconnected networks, which may function as a single large network.

The example network 100 is provided as a specific instance to illustrate more general concepts of bandwidth management, and not to indicate required and/or necessary elements. Within the example network 100, downstream flows 110 and upstream flows 112 of packets are transmitted according to a QoS level indicated by flow labels associated with the packet flows.

An upstream flow 112 of packets may originate from a downstream node. During periods of available bandwidth, the QoS level of upstream flows 112 may be upgraded to utilize the available network bandwidth. The upgrade may be performed in part by an upstream node sending feedback 114 to a downstream node. The feedback 114 may indicate a permissible increase in a QoS of the upstream flow of packets.

Conversely, during periods of network congestion, the root node (or other upstream node) may use the feedback 114 sent to downstream nodes to require them to downgrade the QoS level of upstream flows 112 to the original and/or default QoS (or possibly an even lower QoS level) associated with a service level agreements (SLA).

Additionally, the QoS levels assigned to flows of packets originating from an application or node within the network may be updated from time to time by QoS level assignments 116 sent by a root node or other network manager. Such an update may provide control over bandwidth assigned to each application and/or node, and allow bandwidth assigned to one application and/or node to be changed with respect to other applications and/or nodes.

Detail of an example node 102A is shown. In the example, a radio 118 is configured for communication by means of RF signals 108, and a processing unit or processing circuitry 120. The radio 118 may comprise an RF transceiver configured to transmit and receive RF signals via one or more of a plurality of channels/frequencies. In one example of a wireless implementation, the node 102 may include a single radio transceiver 118 configured to send and receive data on multiple different channels, such as a control channel and multiple data channels on each communication link 108. The radio 118 may also be configured to implement a plurality of different modulation techniques, data rates, protocols, signal strengths, and/or power levels. Additionally, the radio may be configured to sequentially tune a plurality of different frequencies, each for a short period of time, in a "frequency hopping" scheme. In other implementations, each of the nodes may be configured for wired communication. By way of example and not limitation, wired communications may include power line communications (PCL) or other wired communication network technologies, such as Ethernet. The architecture of the network 100 may represent a heterogeneous network of nodes, in that the nodes 102 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

The processing circuitry 120 may include one or more processors 122 communicatively coupled to memory 124. The processor(s) 122 may execute, and the memory 124 may contain, various software statements, software modules, procedures, managers, algorithms, etc. Such functional blocks may be configured in software and/or firmware, and may be executable by the processor(s) 122. In alternative embodiments, any or all of the processor(s) 122, memory 124 and/or functional blocks or modules may be implemented in whole or in part by hardware. Examples of hardware include a microcontroller or other digital device, such as an application specific integrated circuit (ASIC) or other device configured to execute the described functions.

The memory 124, while shown as a monolithic entity, may also be configured as a plurality of similarly and/or differently configured devices, such as read-only memory, writable memory, persistent or non-persistent memory, etc. The memory 124 may be configured to store one or more software and/or firmware modules, which are executable by the processor(s) 122 to implement various functions. The memory 124 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

For purposes herein, all or part of a computer-readable media may be included within an application specific integrated circuit (ASIC) or other hardware device. Such a hardware device may also include processor functionality and may be configured to perform functions consistent with bandwidth management in an AMI. Accordingly, within such an integrated circuit, one or more processors are configured with executable instructions, which may be defined by logic, transistors or other components, and/or memory.

In the illustrated example, memory 124 includes a packet manager 126 that may be configured to receive and transmit packets in the upstream and downstream directions. The packets may include data obtained from one or more meters 128 or other data-receiving or data-generating device(s).

Example Node

Figure 2:
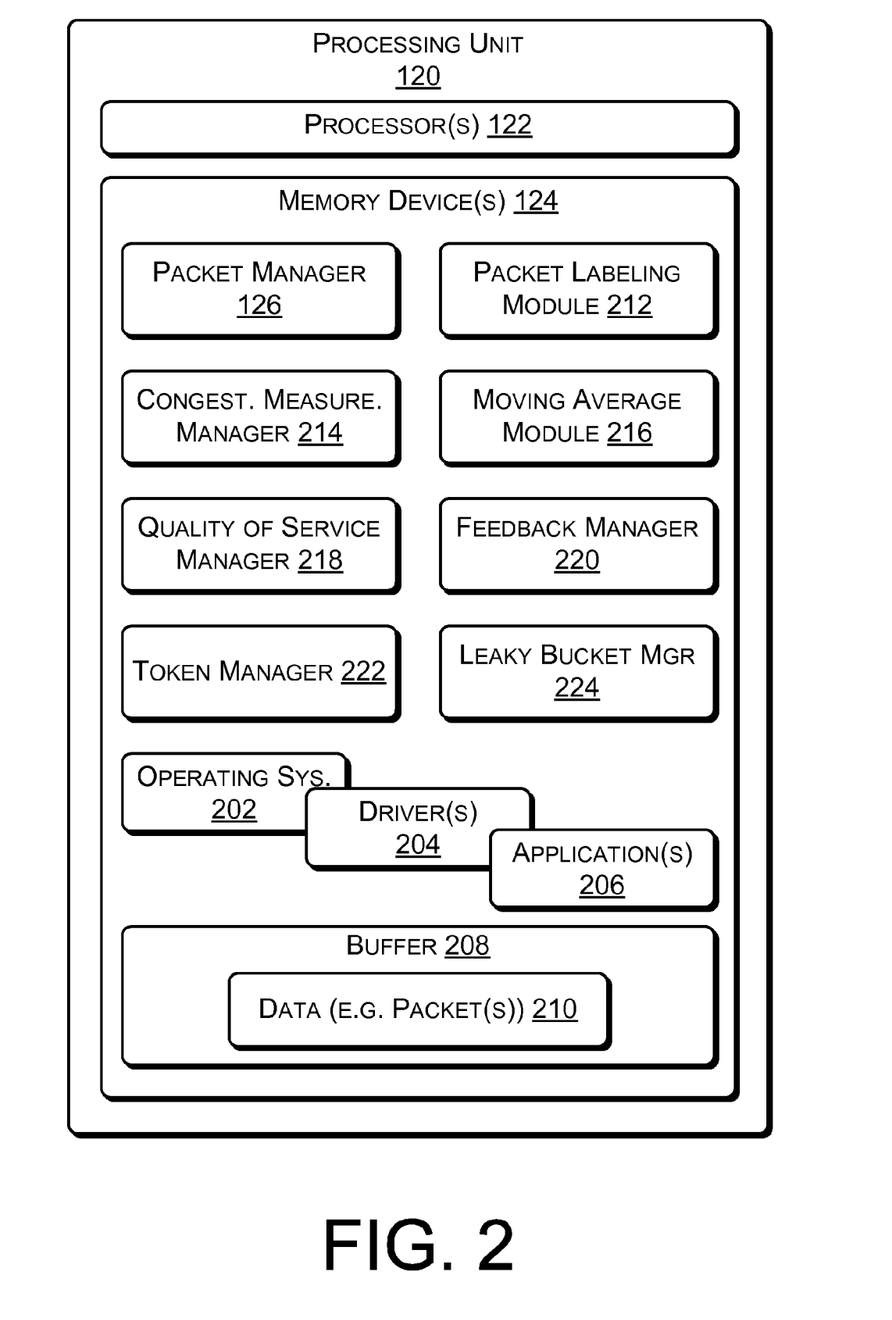
FIG. 2 is a diagram showing example detail of a processing unit of an individual node.

FIG. 2 is a diagram showing example detail of a processing unit 120 of a node 102 (e.g., as seen in FIG. 1). The nodes 102 are representative of nodes within an ARA configured to function as an AMI, and may include a processor 122 and memory device(s) 124. The processing unit 120 of the root node may be configured to implement a flow classification methodology (e.g., a kind of service marking) for QoS level provisioning in the AMI or similar network environment. By way of example, a flow label may be utilized in a flow ID header that is consistent with Internet Protocol version 6 (IPv6). The flow of traffic may be a sequence of packets (or any protocol data unit (PDU)) sent from a particular source, such as a node within the network. The sequence of packets may unicast or multicast to a particular destination, such as a specific downstream node, a set of nodes or all nodes in the ARA. A flow ID header of each packet may include a flow label and possibly other information, such as a source address, a destination address and/or a quality of service indicator. The configuration will identify a flow to which any particular packet belongs. Such recognition allows packets to be processed by nodes in the network in a flow-specific manner.

In some example embodiments, an operating system 202 may support the functionality of one or more drivers 204 and/or applications 206. The drivers 204 and applications 206 may control and operate the radio 118 and/or one or more meters 128 (as seen in FIG. 1). Additionally, the one or more applications 206 are representative of applications that may create, receive and/or retransmit packets within one or more flows of packets.

A buffer 208 is representative of software structures and/or data structures that may be configured within the memory device 124 to provide storage for one or more packets 210, which may be part of one or more packet flows or streams.

A packet manager 126 may be configured to receive and transmit packets in the upstream and downstream directions. The packet manager 126 may utilize the buffer 208 to fetch and/or store packets, and may utilize the radio 118 to send and/or receive packets. In one example, the packet manager 126 is configured to send an upstream flow of packets at a QoS level above a target QoS level specified on an SLA of the upstream flow of packets if indicated by feedback from an upstream node. In another example, the packet manager 126 is configured to send the upstream flow of packets at the QoS level specified on the SLA of the upstream flow of packets if indicated by feedback received form an upstream node.

The packet manager 126 may utilize a packet labeling module 212 to label packets or flows of packets (e.g., with appropriate data in a header portion of the packet(s)). Such information may include one or more of a flow label, a source address and/or a destination address in a header of packets to be transmitted. The labeling may indicate a QoS level for the packet(s), which may determine bandwidth used by transmission of a flow of packets. In one example, the packet labeling module 212 may label packets in a flow of packets with a flow label ID. The flow label implies or indicates a QoS level associated with the flow, associated with an application creating the flow, or associated with a node at which the application is operating.

A congestion measurement manager 214 may be configured to measure and/or estimate congestion of the network 100 in the neighborhood about the node 102 (e.g., as seen in FIG. 1). The congestion measurement manager 214 may estimate network congestion in any desire manner. In one example, a moving average module 216 may be utilized. The moving average module may provide an estimate of network congestion over time using moving average techniques or related techniques and/or structures in hardware and/or software. In one example, the moving average module 216 monitors network congestion at the node using average values over a time interval. In another example, the congestion measurement manager 214 measures congestion based fullness of buffers within the node. Thus, overly full buffers may indicate congestion within the network, and a degree to which a buffer is full may be used as a threshold in measuring network congestion.

A quality of service manager 218 may be configured to manage a service level agreement (SLA) and a quality of service level (QoS level) for one or more packets and/or flows of packets, for one or more applications, and/or for activity on an entire node. In one implementation, the packet manager 126 and/or packet labeling module 212 may call upon the quality of service manager 218 to provide QoS information regarding one or more flows of packets. In one example, a SLA for a particular node, packet flow and/or packet, may be satisfied by a particular QoS level. That is, the indicated QoS level may provide sufficient data throughput to satisfy the SLA. However, during periods of available bandwidth (e.g., periods of low network utilization) the quality of service manager 218 may temporarily associate a higher QoS level with the packet flow, to thereby benefit from the available bandwidth. When the bandwidth is no longer available (e.g., if the network is congested), reception of feedback may indicate the need to reset the QoS level to a lower level that is associated with the SLA of the packet flow.

A feedback manager 220 may be operable based in part on a level of network congestion and configured to provide feedback to downstream nodes (e.g., nodes of higher rank) and/or to receive feedback from upstream nodes (e.g., the root node and/or any other node of lower rank). Feedback may be utilized to increase or reduce bandwidth used by a flow of packets, by an application running on a node, depending on the level of network congestion.

In a first example, the feedback manager 220 may transmit feedback to downstream nodes (or receive feedback from upstream nodes). The feedback may contain instructions to increase a QoS level of a particular flow(s), flows originating from particular application(s) and/or flows originating from a particular node(s). The feedback may be sent in response to a measurement of low network congestion (i.e., the network is under-utilized and has available and/or excess bandwidth). In effect, the feedback may temporarily provide permission to a flow, application and/or node to utilize excess or available bandwidth while it is available.

In a second example, the feedback manager 220 may transmit feedback to downstream nodes (or receive feedback from upstream nodes). The feedback may contain instructions to decrease a QoS level of a particular flow(s), flows originating from particular application(s) and/or flows originating from a particular node(s). The feedback may be sent in response to a measurement of higher network congestion (i.e., the network is highly utilized and has little or no available and/or excess bandwidth). In effect, the feedback may revoke previous feedbacks and/or permission(s) to increase a QoS level.

The techniques described herein may optionally be utilized with token-bucket based mechanism. In one example, a token manager 222 may operate independently or under the direction of the packet manager 126. The token manager 222 may create and/or distribute a plurality of tokens to regulate and/or limit transmission of packets on the network. Tokens may provide permission to a node and/or application operating on the node to transmit a packet or group of packets. By requiring nodes to have a token to transmit packet(s), additional control may be exercised over the flow of packets on the network. In particular, lack of tokens may restrict transmission of packets. For each transmission, based on the QoS level and size of the packet, some parts of the accumulated tokens will be consumed (e.g. deconstructed). Such consumption is important, since a node with no tokens cannot transmit packets.

The techniques described herein may optionally be utilized with leaky bucket-based technology. In one example, a leaky bucket manager 224 may operate independently or under the direction of the packet manager 126. The leaky bucket manager 224 may regulate the transmission of packets by an application or by the node. In one example, packets may be received in an intermittent manner by a node or application. The packets may accumulate at the application and/or node until a limiting quantity (i.e., the size of the bucket) is reached. After that time, additional packets "overflow" from the "bucket." Additionally, packets may be transmitted, perhaps at a steady state, while they remain available in the "bucket." Accordingly, the leaky bucket manager 224 may regulate upstream and/or downstream traffic of packets and flows.

Example Methods

Figure 3:
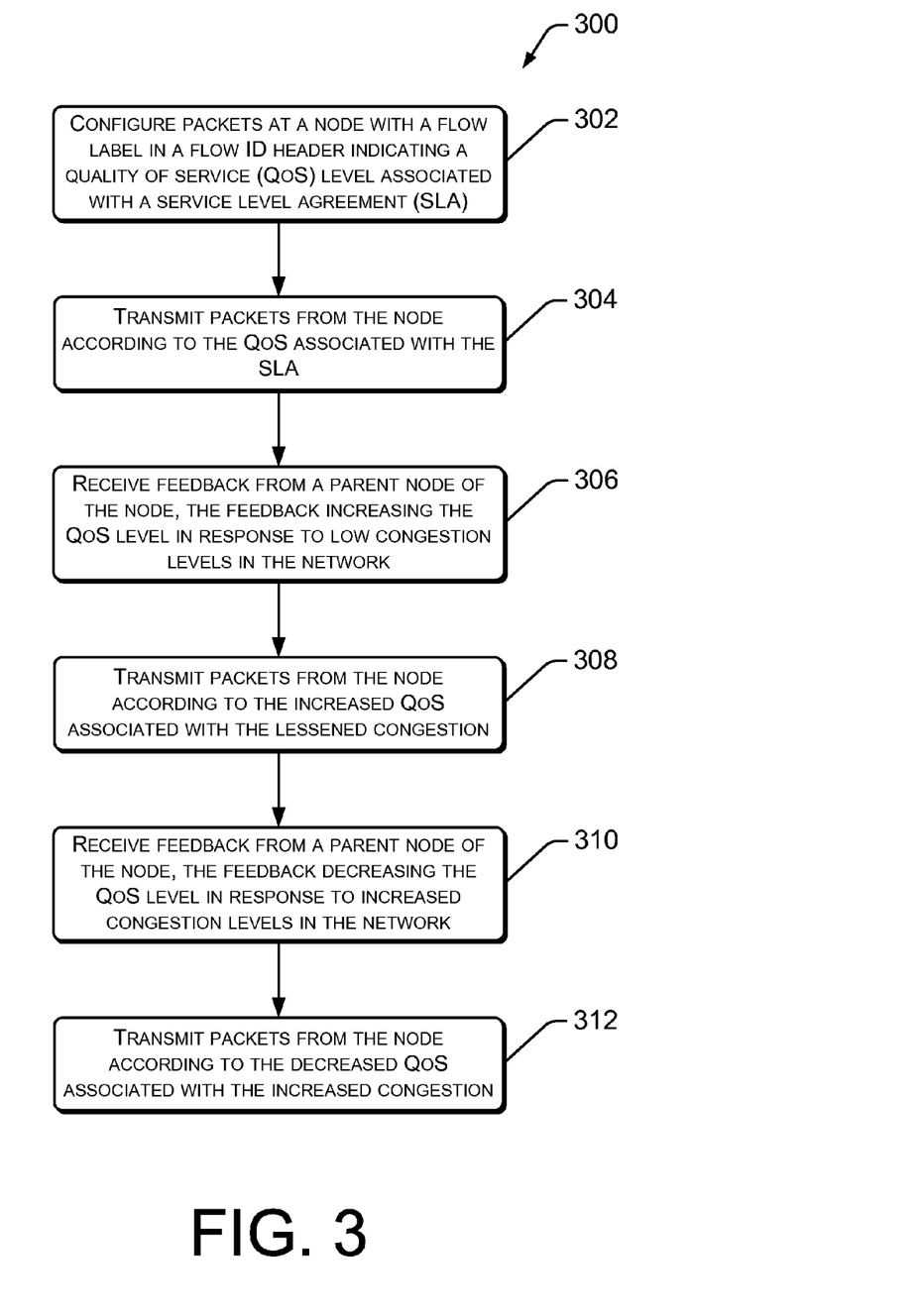
FIG. 3 is a flow diagram illustrating an example method by which a node may configure and transmit packets, receive feedback from a parent node, upstream node and/or root node, and adjust packet transmission in response.
Figure 4:
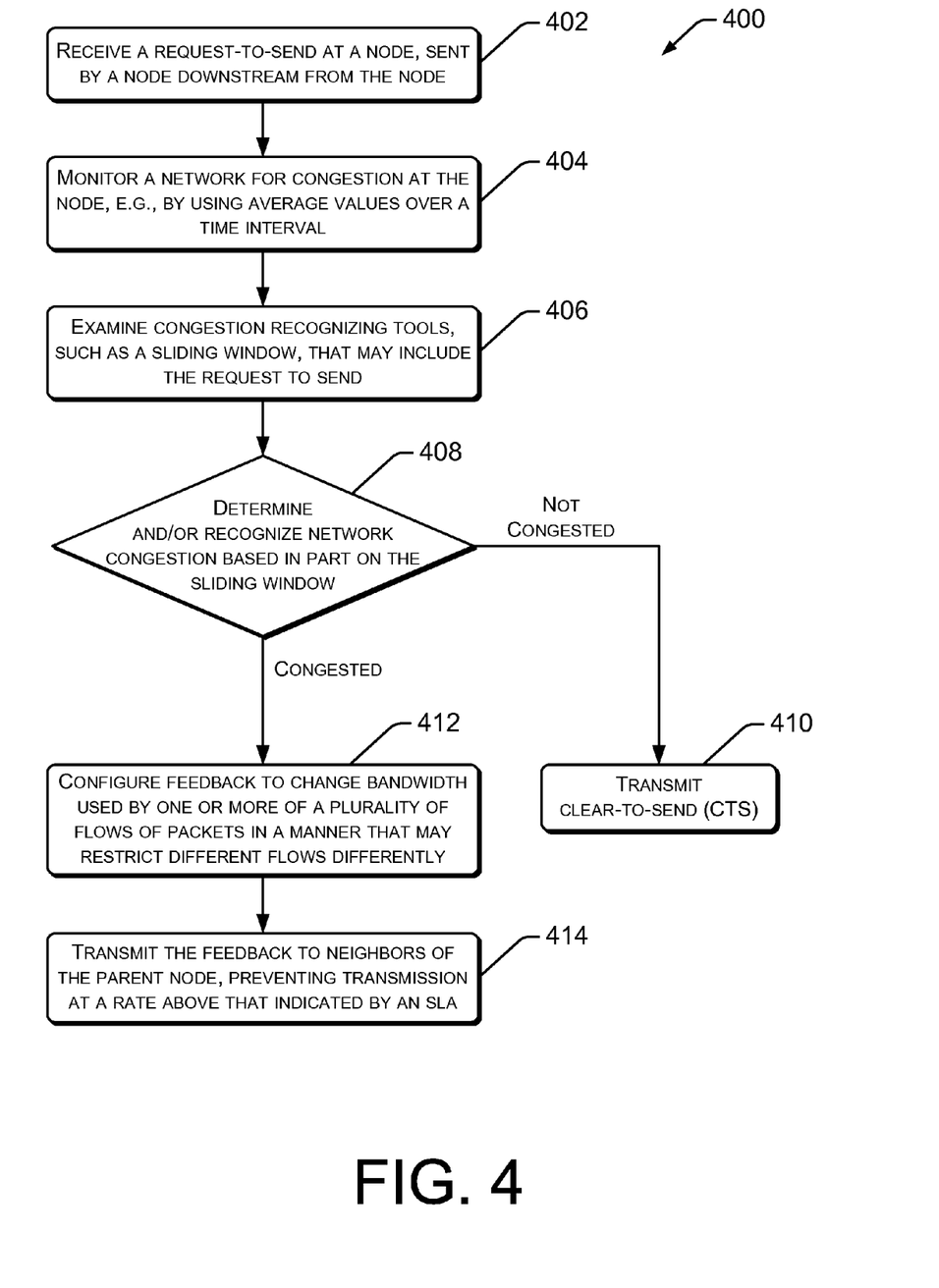
FIG. 4 is a flow diagram illustrating an example method by which a node may recognize network congestion and send feedback in response.
Figure 5:
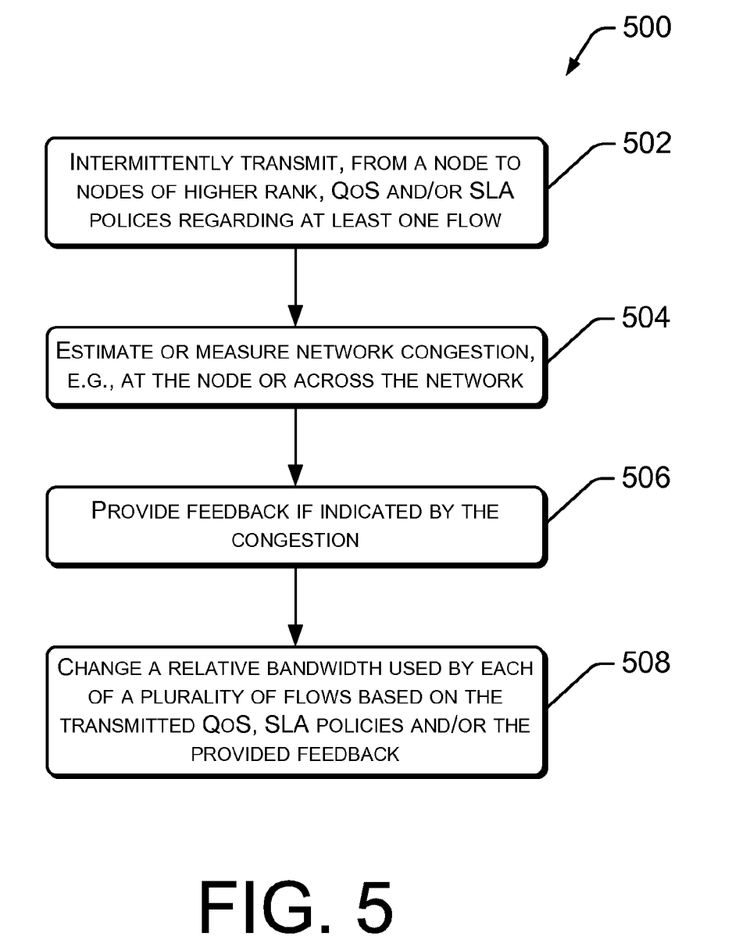
FIG. 5 is a flow diagram illustrating an example method by which feedback configured for upgrading or downgrading quality of service (QoS) level(s) may be used to manage bandwidth in an advanced metering infrastructure.

The example methods of FIGS. 3-5 may be implemented at least in part by the configurations of FIGS. 1 and 2. However, FIGS. 3-5 contain general applicability, and are not limited by other drawing figures and/or prior discussion. Each method described herein is illustrated as a collection of acts, blocks or operations in a logical flow graph, which represent an optional sequence of operations that can be implemented in hardware, software, or a combination thereof. In the context of software, the operations represent computer-executable instructions stored on one or more computer-readable storage media (e.g., memory 124) that, when executed by one or more processors (e.g., processor 122), perform the recited operations. Such storage media, processors and computer-readable instructions can be located within a system, network, node or application according to a desired design or implementation. The storage media 124 seen in FIGS. 1 and 2 are representative of storage media generally, both removable and non-removable, and of any technology. In the context of a hardware device (e.g., an application specific integrated circuit), the logic of the processor, memory and software are configured analogously in the hardware. Thus, the hardware itself is logically similar, and within the scope of, processors, memory and software instructions. Thus, the recited operations described in FIGS. 3-5 may represent actions taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method(s). The above discussion may apply to the methods described herein.

Example Flow Management

FIG. 3 is a flow diagram illustrating an example method 300 by which bandwidth used by a node and/or application sending an upstream flow of packets may be managed in a network. In the example, a flow of packets may originally be associated with a QoS level that is related to a service level agreement (SLA) associated with the flow. Advantageously, available network bandwidth may allow the QoS level to be elevated above the level of the QoS level associated with the SLA. However, if the network becomes highly congested (e.g., busy or highly loaded), then feedback from upstream (e.g., the root node or other low-ranking node) may require the node to restrict bandwidth used by the flow of packets to the QoS level related to the SLA of the flow.

At operation 302, packets are configured at a node with a flow label in a flow ID header indicating a QoS level associated with a service level agreement. At operation 304, the packets are transmitted upstream utilizing a level of bandwidth accorded by the flow label.

At operation 306, feedback is received from a parent node. The feedback is sent in response to low congestion levels in the network, indicating that unused bandwidth is available. For example, network traffic may be below a threshold level or available bandwidth may be above a threshold level. In response to the feedback, the QoS level may be elevated above a QoS associated with the original SLA, and flow labels on packets may be altered to reflect the increased available bandwidth. Thus, upstream flows may take advantage of the increased available bandwidth. At operation 308, packets associated with the feedback may be identified and their time-to-send (i.e., a time at which the packets will be sent) will be recalculated and modified to an earlier time than what was set. The packets are then transmitted from the node according to the increased QoS associated with the available bandwidth in the network.

At operation 310, feedback is received from a parent node. The feedback is sent in response to raised congestion levels in the network, indicating that little unused bandwidth is available. For example, network traffic may be over a threshold level or available bandwidth may be below a threshold level. In response to the feedback, the QoS level may be lowered to a level associated with the original SLA (or even lower, if required), and flow labels on packets may be altered to reflect the decreased available bandwidth. Thus, upstream flows may be restricted due to lack of available bandwidth, particularly upstream flows having QoS levels raised above their SLAs. At operation 312, packets associated with the feedback may be identified and a new time-to-send for a later time than what was set for the identified packets may be calculated. The packets are then transmitted from the node according to the decreased QoS associated with the increased congestion in the network. In some examples, feedback(s) sent to more than one downstream node or application can increase bandwidth to one or more flows of packets, while restricting bandwidth to one or more different flows of packets.

FIG. 4 is a flow diagram illustrating an example method 400 by which a node may recognize network congestion and send feedback in response. During periods of low network congestion and/or load, an upstream flow of packets may be transmitted at a QoS level that allows consumption of more bandwidth than a QoS level associated with a SLA of the flow of packets. If the node recognizes network congestion, it may send feedback to a node sending the upstream flow of packets. The feedback may require the QoS of the upstream flow of packets to be downgraded to the QoS level associated with the SLA of the flow of packets.

At operation 402, a node may receive a request-to-send from a node downstream from the node. The request-to-send indicates that the downstream node has packet(s) to send upstream. The packets may be part of an upstream flow, which may have been sent according to a QoS level that is elevated above a QoS level associated with a SLA of the flow. Such a request-to-send may be responded to with a clear-to-send if the network is not overly congested, or with feedback, if the network is congested.

At operation 404, the node may monitor network congestion, which may assist in determining a response to the request-to-send. In one example, the node may utilize a congestion-measuring technique that averages network utilization values over a time interval. In the context of the example of FIG. 2, the congestion measurement manager 214 may measure congestion on the network. In the example of operation 406, a sliding window is representative of techniques that may be used to average network utilization values over time. In the context of the example of FIG. 2, the sliding window module 216 may be used to help determine network congestion.

At operation 408, network congestion is determined or recognized based on a congestion measurement tool, such as a tool using a moving average, etc. If the network is experiencing low levels of congestion, then at operation 412 the node sends a clear-to-send in answer to a request, and accepts the upstream packet(s). However, if the network is congested (e.g., the congestion is over a threshold utilization) then feedback is sent to the downstream node(s) and/or application(s) sending the packet flow.

At operation 412, feedback may be configured for transmission to the downstream node. In one example, feedback is configured to change the bandwidth available to one or more flows of packets. This may restrict one or more of a plurality of flows in a manner that restricts different flows differently, thereby shaping packet flows within the network.

At operation 414, the configured feedback may be sent to one or more nodes (e.g., one-hop downstream neighbors of the node). Moreover, the feedback may be relayed or passed on from node to node of progressively higher rank. At each node that the feedback is received, the feedback may restrict one or more flows of packets to a QoS level that is associated with an SLA of the flow. Thus, flows that were transmitting upstream using a QoS level that is greater than that indicated by the SLA are downgraded to restrict transmission according to the QoS level associated with the SLA.

FIG. 5 is a flow diagram illustrating an example method 500 by which changes to quality of service (QoS) level, a service level agreement (SLA) and/or the use of feedback may shape network utilization and manage bandwidth consumption in a network configured for advanced metering infrastructure (AMI). At operation 502, a node (e.g., a root node or other upstream node) may intermittently transmit QoS policies or an SLA(s) to downstream nodes (i.e., nodes of higher rank). The QoS policies or SLA(s) may be related to one or more flows of packets, and may restrict or extend the bandwidth allotted to each of the one or more flows.

At operation 504, the congestion at the node is estimated or measured. At operation 506, feedback is provided to downstream (higher rank) nodes if indicated by the estimated or measured congestion. In one example, the feedback may limit bandwidth use by at least one flow of packets to levels indicated by the QoS polices and/or an SLA. In another example, the feedback may provide additional bandwidth for use by the at least one flow of packets, which may be in excess of original QoS and/or SLA values.

At operation 508, a bandwidth used by a flow of packets or a relative bandwidth used by each of a plurality of flows of packets may be changed based on the feedback, the transmitted QoS policies and/or the transmitted SLA polices. Accordingly, the bandwidth allocated to one or more flow(s) of packets can be increased or decreased, thereby managing available network bandwidth in an AMI environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of network bandwidth management, comprising: configuring packets at a node for transmission in an upstream direction, wherein each of the packets is within a flow of packets and is associated with a quality of service (QoS) level based on a service level agreement (SLA); transmitting the packets within the flow of packets at a QoS level above the QoS level based on the SLA if available network bandwidth permits; receiving feedback from a parent node of the node, wherein the node is a neighbor node of the parent node and has a higher rank than the parent node, wherein the feedback restricts the flow of packets to the QoS level based on the SLA, and wherein the feedback is based at least in part on: examination of network congestion; and recognition that the network congestion has exceeded a threshold; and transmitting additional packets within the flow of packets according to a bandwidth indicated by the QoS level based on the SLA.

2. The method of claim 1, wherein the parent node sent the feedback based on operations at the parent node comprising: monitoring the network congestion at the parent node; and transmitting the feedback to the node based on the monitored network congestion, wherein the feedback includes instructions to slow the flow of packets.

3. The method of claim 1, wherein transmitting the packets within the flow of packets at the QoS level above the QoS level based on the SLA if the available network bandwidth permits comprises: detecting a reduced level of congestion at the parent node; and providing additional feedback from the parent node to nodes downstream of the parent node, wherein the additional feedback allows increased bandwidth use by the node for transmission in the upstream direction.

4. The method of claim 1, additionally comprising: receiving, at the node, updated QoS levels, sent from a root node, regarding each of a plurality of flows of packets; and changing a relative bandwidth assigned to each of the plurality of flows of packets based on the updated QoS levels.

5. The method of claim 1, wherein the upstream flow of packets is transmitted based on availability of tokens in a token-bucket system, and the tokens are managed by acts comprising: configuring a quantity of tokens based on: the QoS level of the flow of packets; an estimation of available bandwidth at the node; and the received feedback; transmitting the packets based on the availability of the tokens; and consuming tokens based on transmission of the packets.

6. The method of claim 1, wherein the upstream flow of packets are transmitted based on a leaky bucket technique, and wherein the leaky bucket technique is managed by acts comprising: configuring a leaky bucket based on: the QoS level of the flow of packets; an estimation of the network congestion at the node; and the received feedback; and transmitting the packets based on the leaky bucket.

7. The method of claim 1, additionally comprising: identifying packets whose flow label is indicated by the feedback; and recalculating a time-to-send for the identified packets, wherein the time-to send is either set to an earlier time or postponed by the feedback.

8. The method of claim 1, wherein: the feedback received from the parent node is in response to the congestion at the parent node; and the feedback changes relative bandwidths assigned to at least two flows of packets.

9. The method of claim 1, wherein the feedback limits a rate of packet transmission within the flow of packets but does not limit a rate of packet transmission of a second flow of packets.

10. The method of claim 1, wherein: the feedback is based on operations comprising monitoring the network congestion; and comprises instructions to slow the flow of packets.

11. A node in a network, comprising: a radio transceiver, a congestion measurement manager to determine a level of network congestion; a feedback manager, to use the level of network congestion to determine if feedback should be sent to nodes having a higher rank than the node, wherein the feedback manager configures the feedback to change a quality of service (QoS) level of an upstream flow of packets, and wherein the feedback manager generates feedback based on: the level of network congestion; and recognition of whether the upstream flow of packets is using bandwidth according to the QoS level above the QoS level based on SLA; and
 a packet manager to receive, using the radio transceiver, the upstream flow of packets according to a bandwidth indicated by the QoS level.

12. The node of claim 11, wherein the feedback manager is additionally configured to: reduce bandwidth used by the upstream flow of packets based in part on feedback from the parent node.

13. The node of claim 11, wherein the feedback manager is additionally configured to: increase bandwidth used by the upstream flow of packets based in part on feedback from the parent node.

14. The node of claim 11, wherein the packet manager is configured to: transmit the upstream flow of packets according to the QoS level based on the SLA if feedback associated with the upstream flow of packets has not been received by the feedback manager; and transmit the upstream flow of packets according to a different QoS level if feedback associated with the upstream flow of packets has been received by the feedback manager.

15. One or more non-transitory computer-readable media storing computer-executable instructions that, when executed, cause one or more processors to perform acts comprising: under control of one or more processors on a node, the processors configured with executable instructions: evaluating congestion in a network; sending feedback to a child node of the node, wherein the feedback: increases bandwidth used by a flow of packets in an upstream direction when the evaluated congestion indicates available bandwidth is more than a first threshold value; or
 decreases bandwidth used by the flow of packets in the upstream direction when the evaluated congestion indicates available bandwidth is less than a second threshold value;
 monitoring the network congestion at the node using an average value over a time interval; and configuring the feedback to change bandwidth used by each of a plurality of flows of packets in a manner that restricts different ones of the plurality of flows differently and that is based in part on the average value over the time interval; wherein the feedback: originated at a root node in response to the evaluated congestion; and increases bandwidth to some upstream flows and decreases bandwidth to other upstream flows during the monitoring of the network congestion.

16. The one or more non-transitory computer-readable media of claim 15, additionally comprising: recognizing a flow of packets from an application running on the child node; and configuring the feedback to reduce the flow of packets from the application on the child node from a quality of service (QoS) level greater than required a service level agreement (SLA) to a QoS level not greater than required by the SLA.

17. The one or more non-transitory computer-readable media of claim 15, wherein the feedback directs the child node to perform acts comprising:
   delaying transmission of packets within the flow of packets; and recalculating a time-to-send for enough packets in the flow of packets to conform to a quality of service (QoS). level based on a service level agreement (SLA) of the upstream flow of packets.

18. One or more non-transitory computer-readable media storing computer-executable instructions that, when executed, cause one or more processors to perform acts comprising: under control of one or more processors on a node, the processors configured with executable instructions: evaluating congestion in a network; sending feedback to a child node of the node, wherein the feedback: increases bandwidth used by a flow of packets in an upstream direction when the evaluated congestion indicates available bandwidth is more than a first threshold value; or decreases bandwidth used by the flow of packets in the upstream direction when the evaluated congestion indicates available bandwidth is less than a second threshold value; wherein the feedback directs the child node to perform acts comprising: delaying transmission of packets within the flow of packets; and recalculating a time-to-send for enough packets in the flow of packets to conform to a quality of service (QoS) level based on a service level agreement (SLA) of the upstream flow of packets; and wherein the feedback:
   originates at a root node in response to the evaluated congestion; and
   increases or decreases bandwidth to upstream flows based at least in part on the evaluated congestion.

19. The one or more non-transitory computer-readable media of claim 18, additionally comprising: recognizing a flow of packets from an application running on the child node; and configuring the feedback to reduce the flow of packets from the application on the child node from a quality of service (QoS) level greater than required by the service level agreement (SLA) to a QoS level not greater than required by the SLA.

20. A method of network bandwidth management, comprising: configuring packets at a node for transmission in an upstream direction, wherein each of the packets is within a flow of packets and is associated with a quality of service (QoS) level based on a service level agreement (SLA);
   transmitting the packets within the flow of packets at a QoS level above the QoS level based on the SLA if available network bandwidth permits; receiving feedback from a parent node of the node, the feedback restricting the flow of packets to the QoS level based on the SLA; identifying packets whose flow label is indicated by the feedback; recalculating a time-to-send for the identified packets, wherein the time-to-send is either set to an earlier time or postponed by the feedback; and transmitting additional packets within the flow of packets according to a bandwidth indicated by the QoS level based on the SLA.

* * * * *